US006311426B1

(12) United States Patent
Mehta et al.

(10) Patent No.: US 6,311,426 B1
(45) Date of Patent: Nov. 6, 2001

(54) DIATOMACEOUS EARTH-BIOCHEMICAL FERTILIZER COMPOSITIONS

(75) Inventors: Raj J Mehta; Ashok J Mehta, both of King of Prussia; Sunil Talati, Philadelphia, all of PA (US)

(73) Assignee: Organica, INC, Norristown, PA (US)

( * ) Notice: Subject to any disclaimer, the term of this patent is extended or adjusted under 35 U.S.C. 154(b) by 0 days.

(21) Appl. No.: 09/399,072

(22) Filed: Sep. 18, 1999

Related U.S. Application Data

(63) Continuation-in-part of application No. 09/170,027, filed on Oct. 13, 1998, now abandoned.

(51) Int. Cl.⁷ .............................. C09K 17/40; C05C 11/00
(52) U.S. Cl. .................................. 47/1.01 F; 71/6; 71/16
(58) Field of Search ................................ 71/6, 16, 28, 32; 47/1.01 F, 58.1

(56) References Cited

U.S. PATENT DOCUMENTS

| 3,205,060 | 9/1965 | Lindert . | |
|---|---|---|---|
| 3,658,305 | 4/1972 | Newtson . | |
| 3,898,132 | 8/1975 | Hettrick . | |
| 3,930,755 | 1/1976 | Lahr . | |
| 4,779,376 | 10/1988 | Redenbaugh . | |
| 4,948,413 | 8/1990 | Maekawa . | |
| 5,435,821 | * 7/1995 | Duvdevani et al. | 71/28 |
| 5,534,437 | 7/1996 | Arrau . | |
| 5,578,486 | 11/1996 | Zhang . | |
| 5,741,346 | 4/1998 | Glover . | |
| 5,753,003 | * 5/1998 | Sugawa et al. | 71/6 |
| 6,277,167 | * 8/2001 | Ito et al. | 71/6 |

FOREIGN PATENT DOCUMENTS

| 56143287 | 11/1981 | (JP) . |
|---|---|---|
| 59187721 | 10/1984 | (JP) . |
| 61209981 | 9/1986 | (JP) . |
| 8143411 | 6/1996 | (JP) . |

OTHER PUBLICATIONS

Axis™ Calcined Diatomaceous Earth Soil Amendment Brochure (undated).

* cited by examiner

Primary Examiner—Peter M. Poon
Assistant Examiner—Jeffrey L. Gellner
(74) Attorney, Agent, or Firm—Henry E. Millson, Jr.

(57) ABSTRACT

Soil treatment and fertilizer compositions comprising:
  A) a calcined diatomaceous earth;
  B) an effective quantity of beneficial microorganisms that a) enhance plant growth and, where applicable, crop production, and/or b) control various types of pathogens in the soil, optionally in combination with nutrients selected to maintain the viability of the microorganisms and/or increase their population; and
  C) at least one nitrogen-containing compound compatible with soil and with plants and which can be utilized by the plants either directly or in the form of products obtained by the action of soil microbes.

17 Claims, No Drawings

DIATOMACEOUS EARTH-BIOCHEMICAL FERTILIZER COMPOSITIONS

This application is a continuation-in-part of application Ser. No. 09/170,027, filed Oct. 13, 1998, abandoned.

1. Field of the Invention

This invention relates to biochemical fertilizer and soil conditioner compositions, processes for their manufacture, and methods for their use.

2. Background of the Invention

The use of calcined diatomaceous earth to add porosity to soil is known. Calcined diatomaceous earth is sold by AGRO-TECH 2000, a division of ORGANICA, Inc. of Norristown, Pa. under the trademark AXIS™. This product produces an oxygenating effect in the soil due to its unique internal porosity.

DESCRIPTION OF THE INVENTION

Other than in the operating examples, or where otherwise indicated, all numbers expressing quantities of ingredients or reaction conditions used herein are to be understood as modified in all instances by the term "about".

A composition has now been discovered that improves the structure and composition of soil by adding permanent porosity thereto, by increasing water availability, by increasing soil heat capacity and helping to buffer soil temperature, by increasing soil permeability, by reducing soil bulk density, by oxygenating the soil to provide more and deeper plant roots, by providing beneficial microorganisms to the soil, and by providing nitrogen-containing compounds which arc slowly released to the soil, thus preventing or minimizing leaching of the compounds which would make them unavailable to plants and result in pollution of water systems into which the leached compounds might flow.

It is to be understood that use of the term "plant" as used in the specification and in the claims is meant to include both crop producing and non-crop producing grasses, plants, bushes, and trees.

The compositions of the invention comprise:

A) a calcined diatomaceous earth;

B) an effective quantity of beneficial microorganisms that a) enhance plant growth and, where applicable, crop production, and/or b) control various types of pathogens in the soil, optionally in combination with nutrients selected to maintain the viability of the microorganisms and/or increase their population;

C) at least one nitrogen-containing compound compatible with soil and plants, and which can be utilized by the plants either directly or in the form of products obtained by the action of soil microbes thereon.

The calcined diatomaceous earth used as component A) is diatomaceous earth heated to high temperatures, e.g. from 1500° to 2100° F., preferably from 1700° to to 1900° F., and more preferably about 1800° F. The preferred product for use as component A) is AXIS™ in the form of AXIS™ Regular, AXIS™ Fine, or a mixture of the foregoing in any proportion. Diatomaceous earth calcined at lower temperatures does not possess the unique internal porosity of the present calcined diatomaceous earth.

Component B) can be any beneficial microbial organism or combination of organisms known to enhance the quality of soil for the growth of plants. Such micro-organisms include those from the genera Bacillus, Clostridium, such as *Clostridium pasteurianum*, Rhodopseudomonas, such as *Rhodopseudomonas capsula*, and Rhizobium that fix atmospheric nitrogen; phosphorous stabilizing Bacillus organisms such as *Bacillus megaterium*; cytokinin producing microorganisms such as *Azotobacter vinelandii*; and microorganisms from the genera Pseudomonas, such as *Pseudomonas fluorescens*, Athrobacter, such as *Anthrobacter globii*, Flavobacterium such as Flavobacteriium sp., *Saccharomyces*, such as *Saccharomyces* cerevisiae, and the like.

Microorganisms useful in the practice of the invention can be selected from one or more of bacteria, fungi, and viruses that have utility in soil enhancement. Viruses such as the NPV viruses (nuclear polyhedrosis virus) such as the cabbage looper nuclear poly-hedrosis virus are examples of useful viruses.

Microorganisms, (bacteria, fungi and viruses) that control various types of pathogens in the soil include microorganisms that control soil-born fungal pathogens, such as Trichoderma sp., *Bacillus subtilis*, Penicillium sp.; microorganisms that control insects, such as Bacillus sp. e.g. *Bacillus popalliae*; microorganisms that act as herbicides, e.g. Altemaria sp., and the like.

All of the above microorganisms are well known and are readily available from public depositories including American Type Culture Collection (ATCC) and Agricultural Research Service Culture Collection (NRRL).

A significant advantage for the compositions of the invention is that the micro-organisms can be specifically selected for enhancing the growth of particular plants or crops to be grown in the soil and/or to control pathogens which have been found to be present in the soil, i.e. the microorganisms can be readily tailored to the requirements of the soil and the plants or crops to be grown in it.

Component C), i.e. the at least one nitrogen-containing compound, can be present in the form of an ammonium salt or an amine-or substituted amine-containing compound such as anhydrous ammonia, aqueous ammonia, ammonium salts such as ammonium nitrate, calcium ammonium nitrate, ammonium phosphate, ammonium sulfate, and ammonium sulfate nitrate, urea ammonium polyphosphates, urea, ureaformaldehyde reaction product, and the like. It is to be understood, however, that component C) does not include urine or other animal excreta, e.g. manure, treated or untreated sewage, and the like, animal or fish body fertilizer products, e.g. blood meal, fish emulsions, and the like, or plant based fertilizer products, e.g. humus, compost, and the like. Component C) is at least one discrete compound such as those exemplified above, so that desired quantities of nitrogen can be readily determined and obtained.

Hence, another significant advantage for the compositions of the invention is that the quantity of the at least one-nitrogen containing compound can be specifically selected for the requirements of the plants or crops to be grown in the soil to be treated, taking into consideration the quantities of nitrogen-containing compounds already present in the soil.

It has further been discovered that the component A) calcined diatomaceous earth binds the amine, substituted amine, and ammonium ion groups in the above compounds, providing for slow release of the nitrogen-containing compounds from the compositions of the invention when the compositions are added to the soil.

Optional components that can also be present in the compositions of the invention include natural enzymes, growth hormones such as the gibberellins (gibberellic acid and gibberellin plant growth hormones), and micronutrient elements such as boron, manganese, zinc, copper, iron, and molybdenum.

Other optional components include other water-soluble nitrogen-containing compounds such as sodium nitrate and potassium nitrate; water-soluble phosphorus-containing compounds, such as $CaHPO_4$, $Ca(H_2PO_4)_2$, single superphosphate (made by reacting ground phosphate rock with 70% sulfuric acid), ammonium phosphate, nitrophosphates, monoorthophosphates such as liquid ammonium polyphosphate, and the like; water-soluble potassium-containing compounds such as commercial potash, potassium chloride, camallite ($KCl.M_gCl_26H_2O$), potassium sulfate, potassium nitrate, and the like; other nutrients such as water-soluble calcium, magnesium, and sulfur compounds; and control agents including pesticides such as acaracides and molluskicides, insecticides, fungicides, nematocides, and the like, depending of course on their compatibility with the component B) microorganisms. Compounds useful as control agents may have one activity only, but frequently are effective in more that one of the above categories. Examples of control agents that can be used in the compositions of the invention, depending on component B) compatibility, include inorganic compounds such as elementary sulfur and inorganic sulfur compounds, e.g. calcium polysulfide and sodium thiosulfate, which are effective fungicides, copper, zinc, and other metal inorganics such as copper carbonate, copper oxychloride, copper sulfate, and copper zinc sulfate. Organometallic compounds such as iron and tin compounds, e.g. triphenyl tin hydroxide exhibit both insecticidal and pesticidal activity. Saturated higher alkyl alcohols, either straight or branched chain, such as nonyl and decyl alcohol, can be present as insecticides. Aldehydes such as metaldehyde is an effective molluskicide e. g. useful against snails. Carbonic acid derivatives, especially their mixed esters, are potent acaracides and fungicides, and when sulfur is also present, e.g. mixed esters of thio- and di-thiocarbonic acids, activity is further increased. 6-Methylquinoxaline-2,3-dithiocyclocarbonate is an effective acaricide, fungicide, and insecticide. Carbamic acid derivatives such as aryl esters of N-methylcarbamic acid, e.g. 1-naphthyl-N-methylcarbamate can also be used. Halogen substituted aliphatic monobasic and dibasic carboxylic acids are effective pesticides. Natural pyrethrins and their synthetic analogs are also effective pesticides. Salicylanilide is effective against leaf mold and tomato brown spot. Hetercyclic compounds possessing insecticidal and/or fungicidal activity can also be used. Halogen derivatives of benzene, such as paradichlorobenzene, are effective pesticides, often used against the sugarbeet weevil. Chitin-containing products are effective nematocides Other compounds that can be used include aliphatic mercaptans having four or fewer carbon atoms, organic sulfides and thioacetals, nitro compounds such as chloropicrin, dichloronitroethane, and chloronitropropane, copper and zinc organic compounds, e.g. copper linoleate, copper naphthenate, etc., organophosphorous compounds of which there are well over a hundred, e.g. DDVP, tris-(2,4-dichlorophenoxyethyl) phosphite, derivatives of mono-and dithiophosphoric acids, such as O,O-diethyl S[(2-ethylthio)-ethyl] phosphorodithioate, phosphoric acid derivatives, thiocyanates and isocyanates, phytoalexin, insect killing soaps such as potassium fattty acid salts, and antiallatopropins such as 7-methoxy-2,2-dimethylcltromene and the 6,7-dimethoxy analog.

Where component B) microorganisms are sensitive to light, air, or compounds in component C) or to optional added components, the microorganisms can be separately encapsulated in water soluble coatings, e.g., dyed or undyed gelatin spheres or capsules, or by micro-encapsulation to a free flowing powder using one or more of gelatin, polyvinyl alcohol, ethylcellulose, cellulose acetate phthalate, or styrene maleic anhydride.

The presence of component B) microorganisms in the compositions of the invention provides further enhancement of plant growth, and where applicable, crop production, i.e. by further enhancement is meant benefits in plant growth and crop production in addition to the benefits provided by component B) and C), and/or by providing control of pathogens in the soil. The compositions of the invention can be formulated to be added to soil to replenish chemical elements that have been reduced or exhausted by the soils from crops previously grown, or which have been leached from the soils as a result of poor tillage practices, overirrigation, or natural flooding and to add nutrients to soils naturally deficient in them. The selection of optional components can be customized to the nutrient content of the soil to obtain particular growing objectives.

The relative quantities of components A), B), and C) in the compositions of the invention are dependent in part on the activity of the microorganisms selected for component B). Preferably, component B) will consist of from $1 \times 10^5$ to 1,000 million microorganisms per gram of the composition, and more preferably from 1 million to 100 million microorganisms per gram of composition, with or without added nutrients for the microorganisms.

Component C) can be present in from 0.1 to 25%, preferably from 5 to 15% by weight of the composition.

The optional components can comprise from 0.001 to 10% or more by weight of the composition.

The compositions of the invention are made by forming an aqueous solution or suspension of components B) and C), together with any optional components, and then contacting component A) with the aqueous solution or suspension, e.g. by spraying the aqueous solution or suspension on the calcined diatomaceous earth, or by stirring the calcined diatomaceous earth into the aqueous solution or suspension. The calcined diatomaceous earth is then isolated and dried, e.g. by the use of air drying or warm temperatures in drying ovens. It is of course important to use drying temperatures below those that would inactivate the component B) microorganisms and any heat-sensitive optional components.

The dried compositions contain a coating of components B) and C) and any optional components added to the aqueous solution or suspension on the outside, inside, and to some degree in the pores of the diatoms comprising the diatomaceous earth.

The dried compositions can then be added to soil, e.g. by uniformly mixing the soil with from 5 to 50% by volume, preferably from 10 to 20% by volume, of the composition. If desired, the dried compositions can be used in combination with conventional fertilizers. When component B) is used in the form of water soluble capsules or microcapsules, the aqueous solution or suspension is formulated to contain component C) and any optional components, and this solution or suspension is contacted with the calcined diatomaceous earth and dried. The resulting dried coated calcined diatomaceous earth is then mixed with the component B) capsules or microcapsules to form the finished composition.

Also, the optional components can be added to the aqueous solution or suspension if they are water soluble or water miscible, and/or physically mixed with the dried compositions formed by any of the above processes.

When the compositions of the invention are used to provide a balanced fertilizer to the soil in addition to the benefits obtained from components A), B) and C), i.e. the additional presence of phosphorus and potassium-containing compounds, from 5 to 25% less fertilizer is needed to obtain the same beneficial effects obtained with conventional balanced fertilizers. Balanced fertilizers contain nitrogen, phosphorous and potassium, e.g. having an N:P:K ratio of 6:10:4; 7:5:5; 9:13:7; 18:6:12; 19:8:10; 20:3:3; 25:4:4; 28:4:4; 32:10:10, and the like. These numbers show the percentage of total nitrogen, available phosphorous pentozide ($P_2O_5$), and soluble potash ($K_2O$).

The invention will be illustrated but not limited by the following examples.

EXAMPLES

Example 1

An aqueous solution is prepared containing urea, ammonium phosphate, and potassium chloride in a ratio of N:K:P of 25:4:4, and having a solids content of 15% by weight. To this solution is added with mixing about 100 million *Clostridium pasteurianum* per gram of solids and about 100 million *Rhodopseudomonas capsula* per gram of solids.

The resulting solution is sprayed onto calcined diatomaceous earth (kiln fired at about 1800° F.) having a bulk weight of about 675 lbs/cubic yard, a bulk density of about 0.40 g/cc, a pore size of from 0.1–1 micron, and a screen analysis of 87% on 20 mesh, until the calcined diatomaceous earth is saturated with the solution (about 114%, ASTM F-726).

The saturated calcined diatomaceous earth is then air dried.

Example 2

An aqueous solution is formultated containing $KNO_3$, $Ca(H_2PO_4)_2$, and KC1 in a ratio of N:P:K of 18:6:12 in a water concentration of 10% by weight of solids. To this aqueous solution is added with stirring about 50 million Athrobacter globii per gram of solids.

The resulting solution is sprayed onto calcined diatomaceous earth (kiln-fired at about 1800° F.) having a bulk weight of 700 lbs/cubic yard, a bulk density of 0.42 g/cc, a pore size of 0.1–1 micron, and a screen analysis of 99.5% on 80 mesh, until the calcined diatomaceous earth is saturated with the solution (about 142%,ASTM F-10 726).

The saturated calcined diatomaceous earth is then oven dried at 40[[|S]D C.

Example 3

An aqueous solution is prepared containing 12% by weight of ammonium nitrate. To this solution is added with stirring about 75 million nitrogen-fixing Rhizobium microorganisms per gram of ammonium nitrate.

The resulting solution is then sprayed onto the calcined diatomaceous earth used in the process of Example 1 until the calcined diatomaceous earth is saturated with the solution.

The saturated cacined diatomaceous earth is then air dried.

What is claimed is:

1. A soil treating composition consisting essentially of:

A) a calcined diatomaceous earth which has been calcined at a temperature in the range of from 1500 to 2100° F.;

B) an effective quantity of beneficial microorganisms that a) enhance plant growth and, where applicable, crop production, or b) control at least one pathogen in the soil, or c) both enhance crop growth and, where applicable, crop production, and control at least one pathogen in the soil; and C) at least one discrete nitrogen-containing compound compatible with soil and with plants and which can be utilized by the plants either directly or in the form of products obtained by the action of soil microbes, wherein the at least one discrete nitrogen-containing compound contains at least one of an amine group, a substituted amine group, and an ammonium ion, but does not include urine or other animal excreta, animal or fish body fertilizer products, or plant based fertilizer products.

2. The composition of claim 1 wherein component B) comprises at least $1\times10^5$ microorganisms per gram of the composition.

3. The composition of claim 1 wherein component C) is present in from about 0.1 to about 25% by weight of the composition.

4. The composition of claim 1 wherein component B) comprises from about $1\times10^5$ to about 1,000 million microorganisms per gram of the compositon.

5. The composition of claim 1 wherein component C) is present in from about 5 to about 15% by weight of the composition.

6. The composition of claim 1 wherein component C) plus optional components provide a balanced fertilizer containing fertilizing effective quantities of nitrogen, phosphorous, and potassium.

7. The composition of claim 1 wherein the at least one nitrogen-containing compound is selected from the group consisting of an ammonium salt, ammonia, urea, urea ammonium phosphate, and an urea-formaldehyde reaction product.

8. The composition of claim 6 wherein phosphorous is in the form of at least one compound selected from the group consisting of $CaHPO_{42}Ca(H_2PO_4)_2$, single super-phosphate, triple super-phosphate, a nitrophosphate and a mono-orthophosphate and potassium is in the form of at least one compound selected from the group consisting of potash, potassium chloride, carallite, potassium sulfate, and potassium nitrate.

9. The composition of claim 1 wherein component B) is at least one micro-organism selected from the genera Bacillus, Clostridium, Rhodopseudomonas, Pseudomonas, Arthrobacter, Flavobacteria, Saccaromyces, Azotobacter, Trichoderma, Penicillium, and Alternaria.

10. The composition of claim 1 wherein component B) is in the form of micro-organisms encapsulated in a water-soluble coating.

11. The composition of claim 1 wherein said temperature in component A) is from about 1700 to about 1900° F.

12. A process for preparing the composition of claim 1 comprising the steps of I) forming an aqueous solution or suspension of components B) and C) in water;

II) contacting component A) with the aqueous solution or suspension formed in step I; and III) drying component A) to form the composition of claim 1.

13. The process of claim 12 wherein step II is carried out until component A) is saturated with the aqueous solution or suspension.

14. A method of enhancing plant growth comprising mixing into soil in which plants are growing or are to be grown a growth enhancing quantity of the composition of claim 1.

15. The method of claim 14 wherein the plants are crop-producing plants and both plant growth and crop production are enhanced.

16. The method of claim 14 where the soil is mixed with from about 5 to about 50% by volume of the composition of claim 1.

17. The soil treating composition of claim 1 wherein nutrients selected to maintain the viability of the microorganisms, or increase their population, or both maintain the viability of the microorganisms and increase their population are also present in the composition.

* * * * *